United States Patent

Lee et al.

[11] Patent Number: 6,131,042
[45] Date of Patent: Oct. 10, 2000

[54] COMBINATION CELLULAR TELEPHONE RADIO RECEIVER AND RECORDER MECHANISM FOR VEHICLES

[76] Inventors: Chang Lee, 1217 E. Maryland Ave., St. Paul, Minn. 55106; Chao Thao, 871 Burr St., St. Paul, Minn. 55101

[21] Appl. No.: 09/072,754

[22] Filed: May 4, 1998

[51] Int. Cl.[7] .................................................. H04B 1/38
[52] U.S. Cl. ......................... 455/556; 455/557; 455/345
[58] Field of Search ............................ 455/556, 99, 575, 455/345, 569, 90, 351, 557; 379/454, 455

[56] References Cited

U.S. PATENT DOCUMENTS

| | | | |
|---|---|---|---|
| 4,100,372 | 7/1978 | Hypolite | 455/345 |
| 4,455,454 | 6/1984 | Umebayashi | 455/556 |
| 4,602,358 | 7/1986 | Sato | 455/345 |
| 4,614,839 | 9/1986 | Umebayashi | 455/556 |
| 4,905,304 | 2/1990 | Bardon et al. | 455/345 |
| 4,977,609 | 12/1990 | McClure | 455/345 |
| 5,071,049 | 12/1991 | Mozer | 379/455 |
| 5,086,510 | 2/1992 | Guenther et al. | 455/90 |
| 5,202,913 | 4/1993 | Lang et al. | 455/345 |
| 5,239,700 | 8/1993 | Guenther et al. | 455/345 |
| 5,247,705 | 9/1993 | Attig et al. | 455/345 |
| 5,263,199 | 11/1993 | Barnes et al. | 455/345 |
| 5,319,803 | 6/1994 | Allen | 455/345 |
| 5,418,836 | 5/1995 | Yazaki | 455/550 |
| 5,444,761 | 8/1995 | Nagashima | 455/345 |
| 5,517,682 | 5/1996 | Dayani | 455/90 |
| 5,524,050 | 6/1996 | Boerema et al. | 379/455 |
| 5,584,052 | 12/1996 | Gulau et al. | 455/99 |
| 5,634,209 | 5/1997 | Prudhomme et al. | 455/345 |
| 5,649,316 | 7/1997 | Prudhomme et al. | 455/345 |
| 5,652,564 | 7/1997 | Winbush | 455/346 |
| 5,797,088 | 8/1998 | Stamegna | 455/345 |
| 5,835,586 | 11/1998 | Skowronski | 379/455 |
| 5,836,496 | 11/1998 | Levin et al. | 379/455 |
| 5,974,332 | 10/1999 | Chung | 379/455 |

*Primary Examiner*—Dwayne D. Bost
*Assistant Examiner*—Quochien B. Vuong
*Attorney, Agent, or Firm*—James V. Harmon

[57] ABSTRACT

A combination cellular telephone and radio receiver/tape player/recorder for vehicles includes a cellular telephone circuit and an AM/FM radio receiver including an antenna and loudspeaker. The cellular telephone is wired to the radio receiver for receiving and sending cellular telephone transmissions through the radio antenna and playing telephone messages through the loudspeaker. A dialing keypad is mounted on an armrest beside the driver's seat. The keypad includes a cover and a motor operatively associated with the cover for retracting and replacing the cover so as to enclose the keypad. The tape player/recorder is used to record telephone messages being received or sent by the cellular telephone. An alphanumeric display provided as a component of the basic radio receiver/tape player/recorder is connected to display telephone numbers being called out or called in. A cellular telephone handset with the same telephone number allows passengers in other parts of the vehicle to talk on the telephone.

14 Claims, 4 Drawing Sheets

6,131,042

COMBINATION CELLULAR TELEPHONE RADIO RECEIVER AND RECORDER MECHANISM FOR VEHICLES

FIELD OF THE INVENTION

This invention relates to vehicular communication equipment and more specifically radio communication equipment for vehicles such as automobiles.

BACKGROUND OF THE INVENTION

Current cellular radio telephone equipment used in automobiles often creates a dangerous condition because it is necessary for the driver to drive with one hand on the telephone and one hand on the steering wheel. It may also be necessary to operate the windshield wipers, turn signals, light control switch, cruise control and other equipment while driving and using the cellular telephone. In addition, bad weather conditions often make it necessary to use both hands to operate the vehicle. It is then difficult or virtually impossible to safely operate commercially available cellular telephone equipment. U.S. Pat. No. 4,455,454 provides a radio telephone for a car with a dialing keypad on the steering wheel, necessitating the use of special collector rings inside the wheel. In addition, there is no provision for taking advantage of existing equipment already present in the vehicle or for assuring privacy in confidential conversations. Because of these difficulties, there exists a need for a compact, rugged, inexpensive system that will allow the safe operation of cellular telephone equipment while driving a car or other vehicle. The theft of communication equipment from vehicles is also a widespread problem that has not yet been effectively solved.

In view of these and other deficiencies of the prior art, it is one object of the invention to provide a cellular telephone for vehicles which permits hand-free operation.

An additional object is to provide a cellular telephone for a vehicle that can be operated more safely through a more convenient and safe location of controls.

Yet another object is to provide a more convenient and less expensive alphanumeric visual display than was available heretofore for indicating telephone numbers being called or received.

Another object of the invention is to provide a communication system of the type described which is not immediately visible to an observer looking into the car from the outside until it is revealed, for example by a sales person to a person who is buying or using the car.

These and other more detailed and specific objects of the present invention will be better understood by reference to the following figures and detailed description which illustrate by way of example but a few of the various forms of the invention within the scope of the appended claims.

SUMMARY OF THE INVENTION

The present invention provides a combination cellular telephone, AM/FM radio receiver and recorder for an automobile which includes cellular telephone circuitry that is wired to the basic vehicle AM/FM radio receiver/tape/CD player mechanism (hereinafter referred to for convenience as a radio/recorder/player) provided as a standard feature of the vehicle. This allows receiving and sending cellular radio telephone transmissions, preferably through the existing AM/FM radio antenna. The term "player" herein is intended to include a compact disc player as well as a cassette tape player.

More specifically, the present invention makes use of the vehicle AM/FM radio/recorder/player console which is typically located behind the dashboard and is already provided as part of the basic equipment of the vehicle. A general objective of the invention is to arrange the mobile radio facility, especially a car cellular radio telephone facility of the type mentioned above so that, without basic changes to the vehicle radio/recorder/player console already available, the vehicle can be provided in the most simple, cost effective and theft-proof way with a combination of the AM/FM radio/recorder/player and mobile radio telephone equipment. According to the invention, this object is achieved in that the existing radio/recorder/player is connected by being directly wired to a mobile radio telephone facility which is also located behind the dashboard and makes use of existing stereo speakers for telephone transmissions and a microphone mounted in a fixed position, e.g. on the dashboard, with selector switches on the steering wheel and a concealed dialing keypad located beside the driver's seat in a convenient position to be operated by either the driver or by a passenger in the front passenger seat to the right of the driver. This provides a high degree of security against theft and is also especially advantageous because the cellular telephone described herein including the controls, microphone and speakers permit much safer operation of the vehicle.

In a preferred form of the invention, the dialing keypad is mounted upon an existing armrest provided for one of the driver's arms. A movable cover is opened and closed by an electric motor for reducing the chance of theft by concealing the keypad when the telephone is not in use. The AM/FM radio/recorder/player has an alphanumeric radio station display located on the automobile dashboard. The cellular telephone includes a control module and telephone memory board that is wired to the alphanumeric display of the radio for indicating the telephone number called or being called in. Message recording circuitry is also wired to the cellular telephone to allow frequently called telephone numbers to be recorded for automatic dialing. The existing radio/tape player speakers are used as speakers for the cellular telephone. To provide privacy when needed, a retractable earpiece or earphone can be deployed from an enclosure in the armrest. The existing recorder is also wired to the cellular telephone for recording telephone messages when the driver is not in the vehicle.

THE FIGURES

DETAILED DESCRIPTION OF THE INVENTION

Refer now to the figures wherein the same numerals refer to corresponding parts in the several views.

Figure 1:
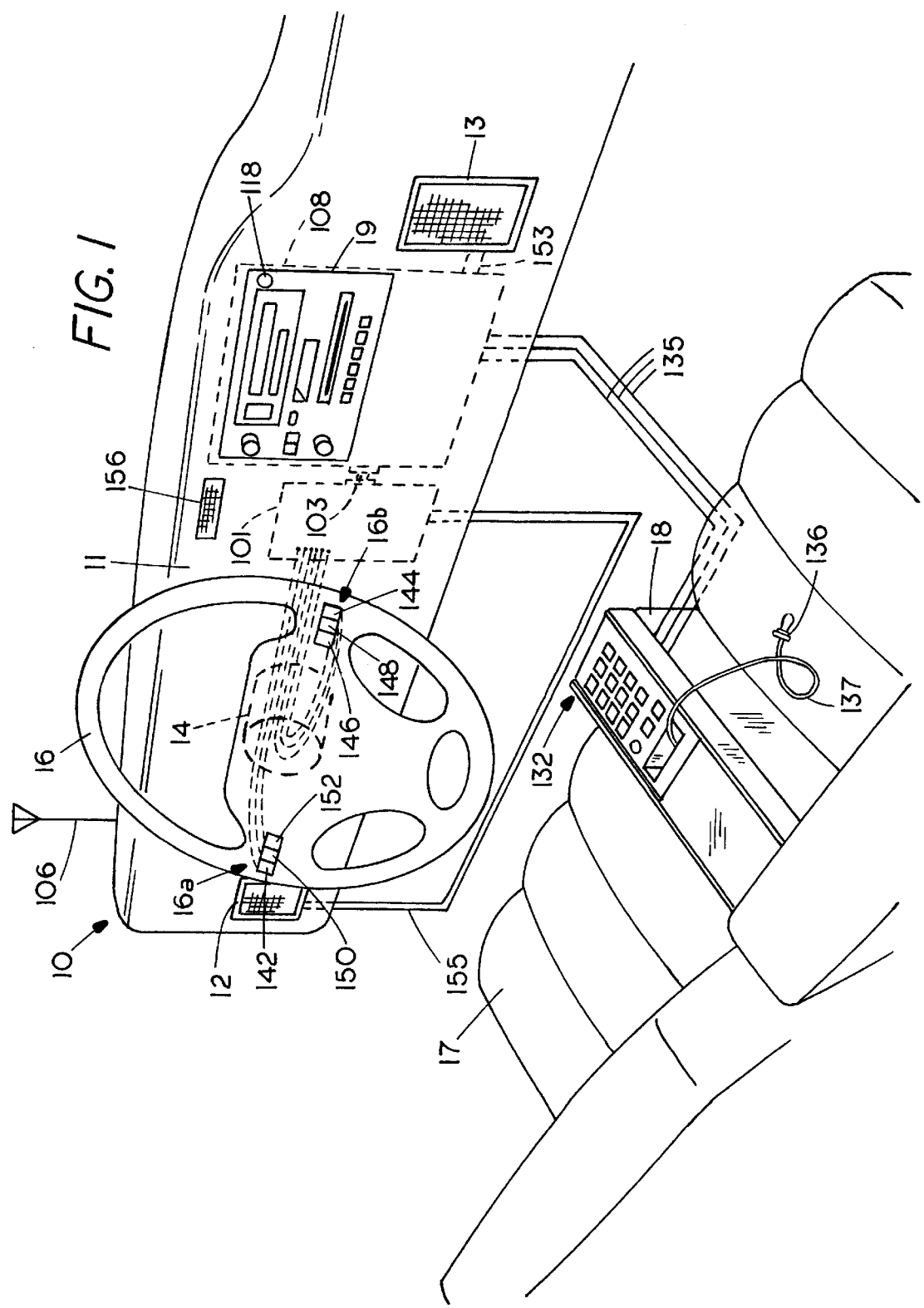
FIG. 1 is a perspective view of the invention installed in an automobile.

In FIG. 1 is shown in perspective the inside of a land vehicle, e.g. an automobile or truck 10 having a dashboard 11, stereo speakers 12 and 13 on opposite sides of the vehicle, and a steering column 14 with a steering wheel 16 of generally conventional construction. The vehicle 10 includes a driver's seat 17 with an armrest 18 supported from the floor of the vehicle 10 beside the driver's seat 17. In accordance with the invention, cellular telephone circuitry 101 and a combined AM/FM stereo radio/cassette tape player/recorder and compact disc player together designated 108 (hereinafter referred to as the "radio/recorder/player console" or simply "console") are wired together and are supported physically behind the dashboard 11. The cassette tape player/recorder itself a part of 108 which is shown at 30 in FIG. 2 can be any suitable commercially available player that also includes a recording mechanism. The cellular telephone circuitry 101 is wired by means of direct electrical connection, i.e. hard-wired, to the radio/recorder/player 108 which includes standard stereo circuitry and is connected to stereo speakers 12, 13. The direct wiring connection between the cellular telephone circuitry 101 and the console 108 is shown diagrammatically in FIG. 1 at 103. The stereo speakers 12, 13 can be wired to the console 108 using any commercially available circuitry or as described in U.S. Pat. No. 4,602,358 which is incorporated herein by reference. The cellular radio telephone circuit 101 itself can be of any suitable known commercially available construction. If desired, circuits such as those described in U.S. Pat. Nos. 4,455,454, 4,977,609 or 5,517,682 can be employed, all of which are incorporated herein by reference.

On the steering wheel 16 are provided two clusters of telephone control switches designated 16a on the left and 16b on the right for operation by the driver's left and right hand, respectively. The clusters of switches on the steering wheel 16 are in diametrically opposed positions adjacent to the location of the hands in the 9 o'clock and 3 o'clock positions and are therefore very conveniently positioned for easy access during heavy traffic, thus allowing the driver to keep his eyes and mind on driving. The operation of the switches 16a, 16b will be described in more detail hereinbelow.

Located in any convenient position on the vehicle 10, and preferably at approximately the center of the dashboard 11, is a microphone 156 which is wired to the cellular telephone circuitry 101 to pick up the voice of the driver or other occupant of the vehicle 10.

Figure 2:
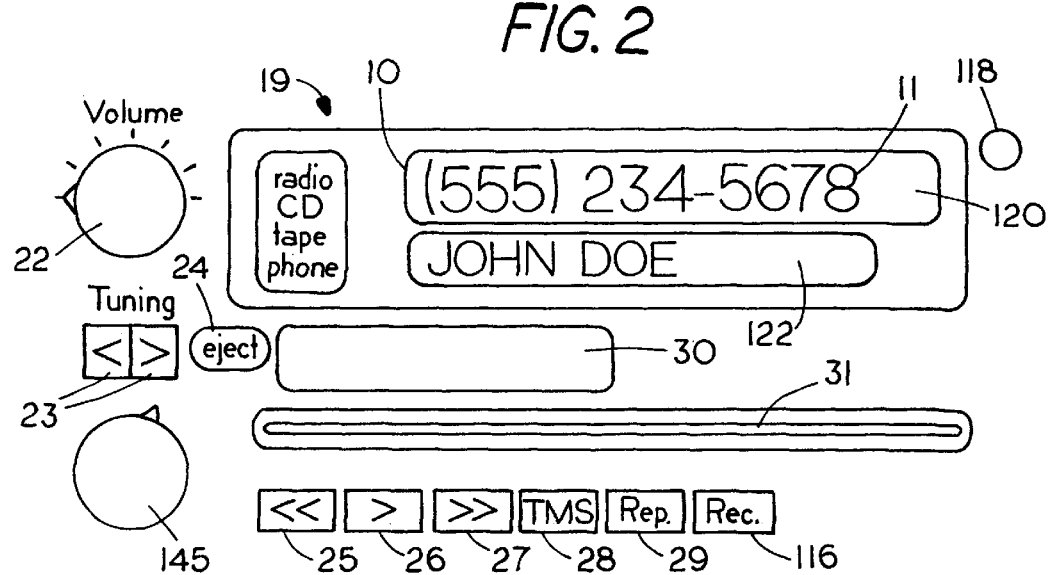
FIG. 2 is a front elevational view of the center portion of the dashboard of FIG. 1 on a larger scale.

Refer now especially to FIG. 2 with reference to the dashboard display indicated generally by the numeral 19. The dashboard display 19 includes the usual items found in a modem radio/cassette/CD player provided with the basic AM/FM radio/recorder/player console package that comes with the vehicle 10, including an alphanumeric, e.g. liquid crystal (LCD), station number display 120 and an "on" light marked "radio CD tape phone" to indicate that both the console 108 and cellular telephone are on, as well as a light 118 to indicate that telephone messages have been received. The dashboard display 19 also includes a tape player/recorder 30 that has an opening to receive a cassette tape, an opening at 31 for a compact disc, a volume control 22, tuning switches 23 for gradual tuning, an eject switch 24 for ejecting a tape or compact disc, and a function or select switch 145 to select "radio," "cassette player," "CD," "tape" or "telephone." The console 108 to be described more fully below also includes the following conventional control switches: rewind switch 25, play switch 26, fast forward switch 27, a tape music sensor 28 for stopping the player at the end of a piece, a repeat button 29, and a record switch 116 for recording a telephone message to be played when the driver is not in the vehicle. The console 108 mode selector switches 25–29 and 116 can be provided as in any commercially available equipment or as described in U.S. Pat. No. 5,263,199 which is incorporated herein by reference. The console 108, together with its dashboard components illustrated in FIG. 2, can be of any suitable commercially available known construction or, if desired, can be wired as described in either of U.S. Pat. Nos. 4,100,372 or 5,263,199 which are incorporated herein by reference.

Figure 3:
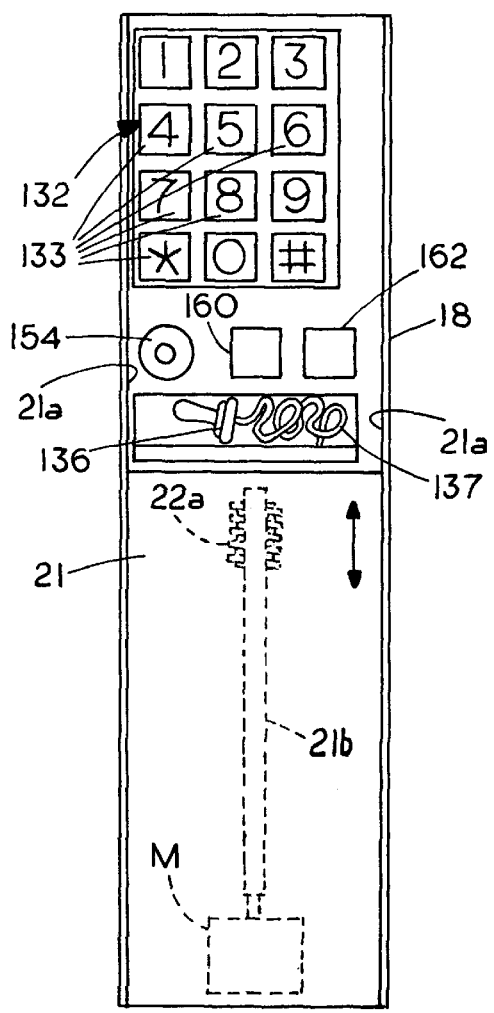
FIG. 3 is a plan view of the dialing control board or dialing pad with the cover retracted.
Figure 6:
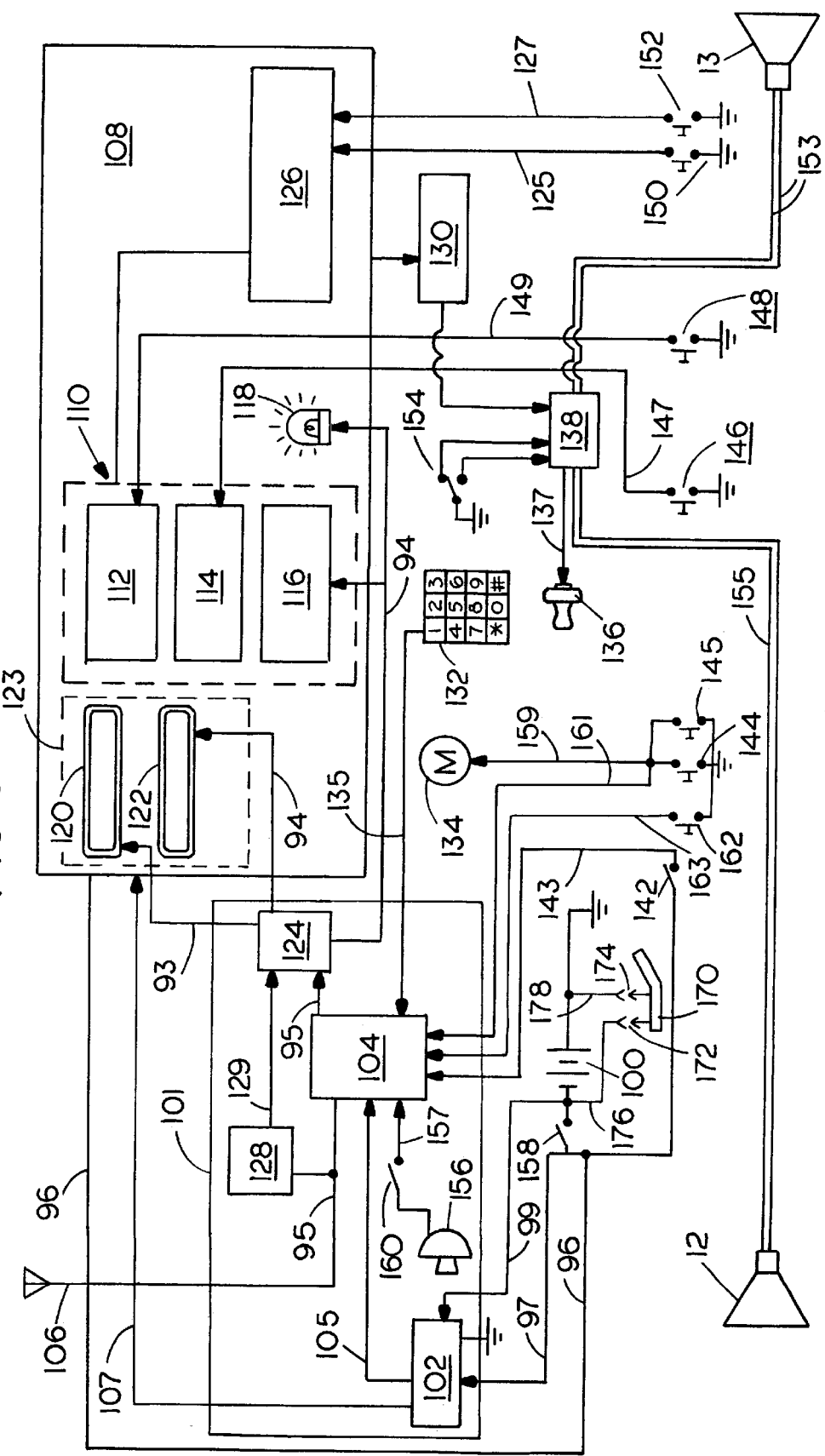
FIG. 6 is a block diagram showing a schematic view of the invention.

Refer now to FIG. 3. On the armrest 18 is provided an upwardly facing telephone dialing pad or keypad 132 of suitable known construction and including numbered pad switches 133 which are wired by means of conductors forming a wiring harness, i.e. cable 135 (FIGS. 1 and 6) to a cellular telephone control module 104 (FIG. 6). Immediately to the rear of the keypad 132 are three switches including an earphone switch 154 to actuate an earphone 136 which is connected to the cellular telephone 101 by conductor 137 via a clocked switch 138 and amplifier 130, a mute switch 160 to turn off the microphone 156, and a speed-dial switch 162 (all to be described more fully below).

Figure 4:
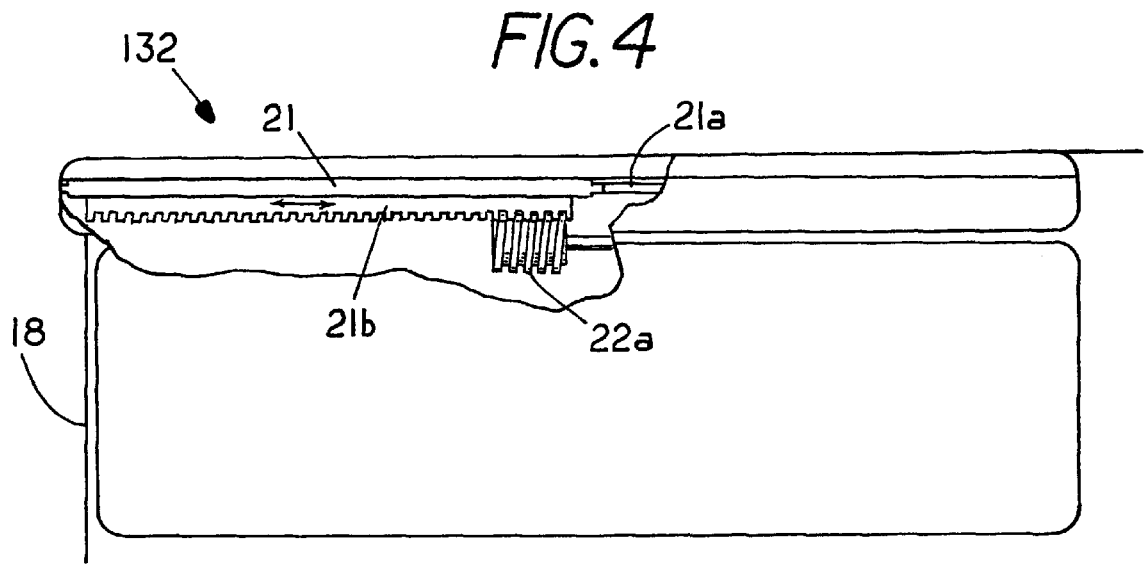
FIG. 4 is a left side elevational view of the dialing pad of FIG. 3 on a somewhat reduced scale.
Figure 5:
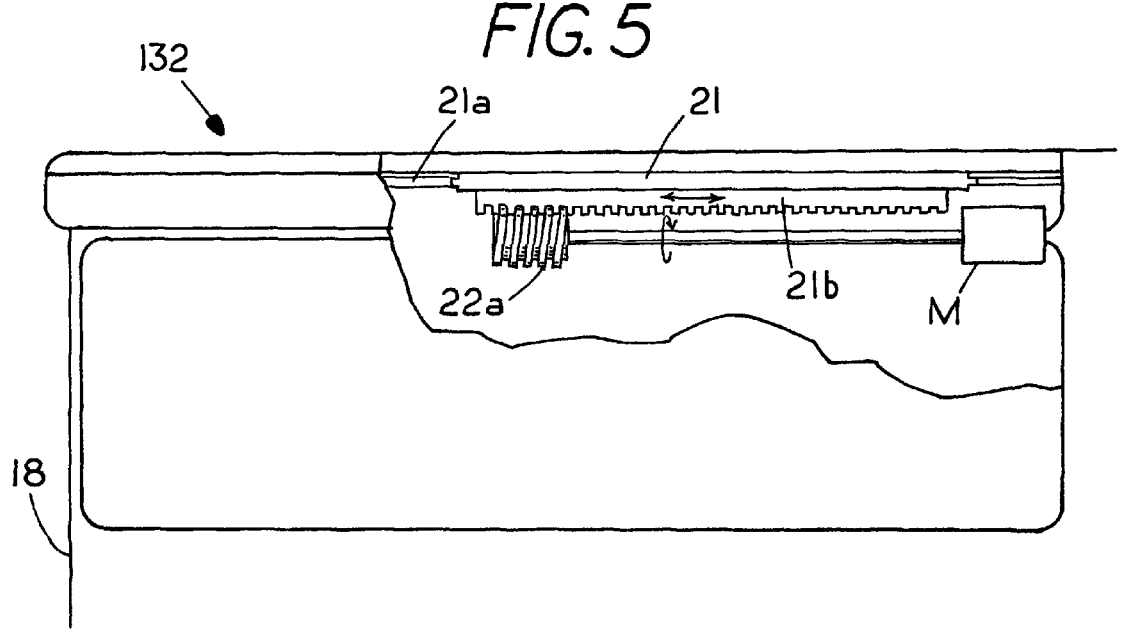
FIG. 5 is a side elevational view similar to FIG. 4 partially broken away to show the sliding cover in a retracted position.

Both the keypad 132 and the earphone 136 are normally enclosed beneath a sliding cover 21 (FIGS. 3–5) that is mounted in tracks 21a on each side of the armrest 18. When the driver or other occupant of the vehicle wishes to operate the keypad 132, a telephone "on" switch 142 on the left-hand side of the steering wheel 16 is closed, thereby turning on the cellular telephone 101. After this has been done, either of the function selector or hook switches 144 or 145 is closed to energize an electric motor 134 (FIG. 6) that is designated M in FIGS. 3 and 5. The motor M is connected to the retractable sliding cover 21 in any suitable manner, e.g. by the provision of a worm gear 22a at the end of motor shaft 22b. The worm gear 22a is coupled as shown in FIG. 5 to a rack 21b affixed to the lower surface of the retractable cover 21 so as to provide access to the telephone keypad 132 and adjacent switches shown in FIG. 3. Reversing the motor M will return the cover 21 to its original position to conceal the keypad 132.

Refer now to FIG. 6 which comprises a block diagram illustrating a schematic representation of the invention wherein the same numerals refer to corresponding parts already described. To aid in understanding the operation, conductors have been provided, where appropriate, with arrowheads to indicate the direction of transmission. An automobile battery 100, e.g. a 12-volt battery, is connected via conductor 99 to a telephone answering machine control module 102 and through a switch 158 that is coupled mechanically to the ignition switch of the vehicle (not shown) via conductor 97 to the module 102 and via conductor 96 for turning on the console 108 when the switch 158 is closed. If desired, the telephone answering function can be carried out by the answering machine control module 102 as in any commercially available equipment or as described in U.S. Pat. No. 5,444,761 which is incorporated herein by reference. The telephone answering module 102 is connected to a telephone control module 104 via conductor 105 and to the console 108 via conductor 107. Antenna 106 is connected to the telephone control module 104 and to a caller ID module 128 via conductor 95. The caller ID module 128 is connected to a telephone memory board 124 through conductor 129, and the telephone control module 104 is connected to the latter by conductor 95. The console 108 circuitry includes the alphanumeric LCD display 120 already described. The display 120 serves as an economical and convenient way to indicate telephone numbers being called and called in, since it is already provided as a basic part of the console 108. In addition, there is provided a second alphanumeric display, such as an LCD 122, that is used to display caller identification. The LCD 122 is connected via conductor 94 to the telephone memory board 124 for displaying the caller's name, and the memory board 124 is connected to the LCD 120 by conductor 93 for displaying the caller's telephone number. As a part of the console 108 there is provided a tape player module 110 which includes a rewind module 112, a fast forward module 114 and a recording module 116. An LED 118 indicates that the recording module 116 is recording a message. The module 116 and LED 118 are connected to the memory board 124 via conductor 94. The displays 120 and 122 are both components of a standard display module 123 of suitable known construction.

The console 108 includes a tape/CD volume control module 126 which is coupled via conductors 125, 127 to increase volume switch 150 and decrease volume switch 152 as also shown on the left-hand side of the steering wheel 16 in FIG. 1. Next to them is the power "on" switch 142 which connects the battery 100 to the telephone control module 104 via conductor 143 when the ignition switch 158 is in a closed position. On the right-hand side of the steering wheel 16 is provided a fast forward switch 146 connected to the fast forward module 114 via conductor 147 and a rewind switch 148 connected via conductor 149 to the rewind module 112. The fast forward switch 146 places the tape or compact disc containing a caller's recorded message in fast forward. The rewind switch 148 rewinds the tape containing the caller's message.

Also coupled to the telephone control module 104 via conductor 163 is a switch 162 to operate the telephone control module for speed dialing. When the telephone circuit 101 is energized, speed-dial control switch 162 controls the telephone module 104 for pre-selected telephone numbers that are stored in memory on the telephone memory board 124. A pair of function selector or hook switches 144 and 145 which supply current to the telephone control module 104 and motor 134 via conductors 161 and 159 are each used as hook switches for turning on the telephone control module 104 and simultaneously energizing the motor 134 to withdraw the cover 21 so as to expose the keypad 132 and uncover the switches 154, 160, 162 and the earpiece 136. The speakers 12 and 13 are wired to the amplifier 130 through the clocked switch 138 via conductors 155 and 153, respectively.

The operation of the cellular telephone 101 and radio/recorder/player 108 while energized to function in the telephone mode will now be described with particular reference to FIG. 6.

The battery 100 powers the telephone control module 104, the radio/recorder/player 108, and the answering machine control module 102 directly through conductor 99. All other components in the diagram either receive power from the telephone control module 104; from the answering machine control module 102 through conductor 105; or through the console 108 with current supplied through conductor 107. Power for the cellular telephone 101 is routed in two ways. First, power is supplied through the power "on" switch 142 located on the steering wheel 16. When the vehicle ignition switch (not shown) is turned on, power can only enter the telephone 101 if the power "on" switch 142 has been turned on. In addition, power is routed through the answering machine control module 102 through switch 158 when the main vehicle ignition switch (not shown) is turned off. Thus, when the vehicle ignition switch has been turned to the "off" position, switch 158 is closed and power flows through conductor 97 indicating to the answering machine control module 102 to begin answering calls because the owner is not operating the vehicle. The answering control module 102 then routes power to the telephone 101. This allows the telephone 101 to answer calls while the owner is away and the vehicle 10 is not in use. The answering machine control module 102 also provides power to the console 108 via conductor 107 for recording messages. During operation, the answering machine control module 102 sends signals through telephone control module 104 to a telephone memory board 124. This indicates to the telephone memory board 124 that the owner is not in the vehicle and activates the recording mechanism when the telephone is answered.

The cellular telephone 101 and the radio/recorder/player 108 utilize the existing radio antenna 106 that is provided as part of the basic communication system of the vehicle. Even with the user not present, the caller ID module 128 monitors incoming signals received by the telephone control module 104 from the antenna 106 in order to identify the caller. The caller ID module 128 then sends the information to the telephone memory board 124 via conductor 129. This information is stored in memory and can be accessed by pressing the rewind or fast forward switches 25 or 27 on the face of the radio/recorder/player 108 to display caller ID information on the LCD 120 and the caller identification display 122 while the caller's message is playing.

When the driver or passenger wants to make a call from the vehicle 10, the function switch 144 on the steering wheel 16 is pressed to actuate the telephone control module 104 and to send power to the armrest cover motor 134 which then opens the cover 21. The signal sent to the telephone control module 104 energizes the telephone 101, i.e. takes the telephone off the hook. The user then punches the desired number into the keypad. The user can also obtain a telephone number from the speed-dial list stored in the telephone control module 104 in the following way. The numbers stored in the memory of the telephone memory board 124 are passed to the displays 120, 122. Each number selected from storage is sent individually each time the speed-dial switch 162 located adjacent the keypad 132 is pressed. To hang up the cellular telephone 101, the function selector switch 144 is pressed a second time. This action of selector switch 144 also acts to initiate the closure of the armrest cover 21 by reversing the direction of motor M, designated 134 in FIG. 6.

The microphone 156 is placed in a fixed position, preferably behind a screen in the dashboard 11 just above the cluster of gauges, e.g. speedometer, etc., so as to be in a convenient position to be used by the driver or passenger for talking on the cellular radio telephone 101. The sounds picked up by the microphone 156 are sent to the cellular telephone 101 via conductor 157 except when mute switch 160 is opened. The mute button 160 allows the microphone 156 to be turned off temporarily while the telephone 101 remains on. The sound signal from the microphone 156 is then transmitted by the cellular telephone 101. Telephone transmission being received by the telephone 101 travels from the telephone control module 104 through the radio/recorder/player 108 to the stereo amplifier 130 and is carried through conductors 155, 153 to the existing speakers 12, 13 that are already provided as a part of the radio/recorder/player 108 package supplied as a basic component of the vehicle. The operation of the switch 154 (FIGS. 3 and 6) determines whether the sound transmission goes to the speakers 12, 13 or to the earphone 136. If the switch 154 is on, then the clocked switch 138 will be energized and sound transmission will be directed goes to the earpiece 136, but if switch 154 is off, then the clocked switch 138 is off and the sound will be directed to the speakers 12, 13.

The steering wheel 16 is also equipped with the following switches to control the volume of the telephone 101 and to listen to messages recorded when the owner was not present. Switch 150 raises the volume and switch 152 lowers the volume of sound produced by the speakers 12, 13. When a call is received, telephone control module 104 sends ring pulses to the speakers 12 and 13, producing an audible ring. If a call comes in when the owner is not present, the telephone control module 104 answers the call by energizing the telephone circuit 101 responsive to the incoming call. When the telephone is not answered, answering machine control module 102 then signals the telephone memory board 124 that the owner is not present. Either the telephone memory board 124 or tape recorder 30 contains a stored message indicating that the owner is not able to answer the call. The message is then played for the caller. The tape recorder 30 is energized in the record mode to enable the caller to leave a message. In this way, callers are able to leave messages on the tape recorder 30 provided as a part of the basic radio/recorder/player 108 furnished with the vehicle. When the telephone memory board 124 receives incoming call information from the telephone control module 104, it sends the information to the recorder module 116 which records the information on the tape of the tape player 30 using standard circuitry of known construction. When information is received and recorded, the telephone memory board 124 also energizes the message recording light LED 118 which then begins to flash whether the radio/tape/CD is on or off. When the flashing of light 118 is noted by the driver, she closes the switch 144, allowing the telephone to be answered which turns the phone mode indication light 118 on continuously. Once the user is finished using the cellular telephone 101, the operation of the function selector or hook switch 144 is used to switch back to the mode that was in use prior to the incoming telephone call. If desired, standard circuitry can be employed for enabling the user to select a certain number of rings to answer and then record telephone messages. Later, to listen to messages, the owner may use the rewind switch 148 or fast forward switch 146 on the steering wheel which energizes the modules 114 and 112, respectively, for playing back recorded messages.

For the convenience of passengers in the back seat or in other parts of the vehicle 10, a radio telephone handset 170 is provided. The handset 170 can be any suitable commercially available cellular telephone with its own built-in antenna. The handset detector circuitry is given the same telephone number as the cellular telephone 101. In this way, other occupants of the vehicle 10 can use the telephone. This is of particular value with larger vehicles such as vans or recreational vehicles. The supplemental handset 170 is provided with plug connectors 172, 174 which are connected via conductors 176, 178 to the battery 100 for recharging the handset 170. The plug connectors 172, 174 can be located in any convenient place in the vehicle 10 such as in the glove compartment (not shown).

The invention provides ease of control and operation and thus is safer to operate while the vehicle is being driven. By locating the keypad 132 close to the driver's right arm and hand, the numbers and switches can be easily accessed. Moreover, because the telephone 101 is behind the dashboard 19, it will be difficult or impossible to even know there is a cellular telephone in the vehicle 10 until it is revealed to a purchaser or user of the vehicle. Moreover, the invention utilizes the amplifiers and speakers of the existing radio/recorder/player as well as the alphanumeric LCD display on the dashboard that are provided as part of the basic audio console package already furnished with the vehicle. This makes telephone sound reproduction and the display of the caller's name and number both convenient and economical because it makes use of existing equipment. However, if privacy is desired, the earphone 136 located next to the keypad 132 for easy access provides the driver or passenger the advantage of a private conversation. If desired, the earphone 136 can be provided with an automatic rotor (not shown) to roll up the cord 137 when the earphone 136 is no longer needed.

The invention provides further economies in utilizing the existing tape player 30, existing rewind and fast forward functions 112, 114 and recording module 116 for saving recorded messages and for recording the user's message. Light 118 can, if desired, be a flashing red light to indicate that the recorder is recording a message or that messages have been received. If speed dialing is desired, the "*" switch on the keypad 132 can be used.

In summary, the invention provides automobile drivers and passengers with greatly enhanced safety while driving and talking on the telephone. Moreover, the invention allows a person to operate a manual transmission vehicle in busy traffic and still be able to talk on the telephone with one hand on the steering wheel and the other on the gear shift lever. The invention also enables the driver to call more easily for help when the car is in trouble in a remote area. The lack of additional equipment, e.g cellular telephone antennas on the exterior of the vehicle, and the concealed circuitry of the cellular telephone 101 behind the dashboard 11 and keypad concealed beneath cover 21 greatly reduces any chance of theft.

Many variations of the present invention within the scope of the appended claims will be apparent to those skilled in the art once the principles described herein are understood.

What is claimed is:

1. A combination cellular telephone and AM/FM radio receiver, tape player/recorder mechanism for a vehicle having a driver's seat, comprising, a cellular telephone devoid of a handset, a radio receiver and tape player/recorder mechanism including an antenna and a loudspeaker, said cellular telephone being wired to the radio receiver and tape player/recorder for receiving and sending cellular telephone transmission through said radio antenna and transmitting sound communication through said loudspeakers, the cellular telephone being hardwired by direct wiring connection to the radio receiver and tape player/recorder and supported physically behind an interior surface of the vehicle, a dialing keypad mounted upon an upper portion of an armrest positioned beside a driver's seat within said vehicle that is connected to the cellular telephone for dialing a number being called, function control selector switch means wired to the cellular telephone for controlling the operation of said cellular telephone, a movable cover over the keypad, and motive power means connected to the cover for automatically concealing the keypad while the cellular telephone is not in use, hook switch means for turning off the cellular telephone that is operatively associated with the motive power means whereby when the cellular telephone is hung up, said cover is moved to a closed position over the keypad by the motive power means without attention of the user.

2. The combination cellular telephone and AM/FM radio receiver, tape player/recorder mechanism of claim 1 wherein said cellular telephone has a control module, the radio receiver includes an alphanumeric display, the telephone control module is operatively connected to the alphanumeric display for indicating a telephone number being called out or being called in, and the alphanumeric display is on a dashboard of said vehicle.

3. The combination cellular telephone and AM/FM radio receiver, tape player/recorder mechanism of claim 1 wherein said radio receiver is connected to a recording means, the recording means is operatively connected to the cellular telephone for recording incoming messages and the cellular telephone has a telephone memory board, the radio receiver has an alphanumeric display, and the alphanumeric display is connected to the telephone memory board for displaying a telephone number being called out or called in.

4. The combination cellular telephone and AM/FM radio receiver, tape player/recorder mechanism of claim 1 wherein the function control switch is contained within a cluster of switches on the steering wheel that is located adjacent the periphery of the steering wheel so as to be accessible to a driver without the driver removing his hands from the steering wheel and the cluster of switches is wired to the cellular telephone for controlling the operation thereof.

5. The combination cellular telephone and AM/FM radio receiver, tape player/recorder mechanism of claim 4 wherein said clusters of switches include at least two of the following: a power switch for the telephone, a volume control for the telephone, a switch for forwarding or reversing a recorder device, and a telephone hook switch.

6. A combination cellular telephone and AM/FM radio receiver, tape player/recorder mechanism for a vehicle having a driver's seat, comprising, a cellular telephone devoid of a handset, a radio receiver and tape player/recorder mechanism including an antenna and a loudspeaker, said cellular telephone being wired to the radio receiver/tape player/recorder for receiving and sending cellular telephone transmissions through said radio antenna, a dialing keypad mounted upon an upper portion of an armrest positioned beside a driver's seat within said vehicle is connected to the telephone for dialing a number to be called, said radio includes at least one speaker, the cellular telephone is operatively connected to the speaker for transmitting audible messages received by the telephone through said speaker, the cellular telephone being hardwired by direct wiring connection to the radio receiver and tape player/recorder and being unexposed in the vehicle, function control selector switch means wired to the cellular telephone and located on a steering wheel adjacent the periphery of the steering wheel for controlling the operation of said cellular telephone, motive power means connected to a keypad cover over and connected to said cellular telephone to move the cover to a closed position over the keypad to automatically conceal the keypad without the attention of the user when the cellular telephone is not in use, the recorder is operatively connected to the cellular telephone for recording incoming messages and messages to be transmitted by the telephone, the cellular telephone has a telephone memory, the radio receiver has an alphanumeric display, and the alphanumeric display is connected to the telephone memory for displaying a telephone number being called out or called in.

7. The combination cellular telephone and AM/FM radio receiver, tape player/recorder mechanism of claim 6 wherein an earphone is connected to the cellular telephone and a selector switch is connected for actuating either the operation of the speaker or the earphone.

8. The combination cellular telephone and AM/FM radio receiver, tape player/recorder mechanism of claim 7 wherein the earphone is on a retractable cord.

9. The combination cellular telephone and AM/FM radio receiver, tape player/recorder mechanism of claim 6 wherein there are provided two clusters of switches, one at the 3 o'clock position on the steering wheel and one at the 9 o'clock position on the steering wheel so as to be accessible to a driver without the driver removing his hands from the steering wheel.

10. A combination cellular telephone and AM/FM radio receiver, player mechanism for a vehicle having a driver's seat, comprising, a cellular telephone which is not a handset, a radio receiver and player mechanism including an antenna and a loudspeaker, said cellular telephone being wired to the radio receiver and player mechanism for receiving and sending cellular telephone transmission through said radio antenna and transmitting sound communication through said loudspeakers, the cellular telephone being hardwired by direct wiring connection to the radio receiver and player mechanism and supported physically behind an interior surface of the vehicle, a dialing keypad mounted upon an interior part of a vehicle and connected to the cellular telephone for dialing a number being called, function control selector switch means wired to the cellular telephone for controlling the operation of said cellular telephone, a movable means for concealing the keypad, and motive power means connected to the movable means for imparting motion thereto, and switch means operatively associated with the motive power means for enabling the movable means to conceal the keypad by the motive power means when the cellular telephone is not in use.

11. The combination cellular telephone and AM/FM radio receiver, player mechanism of claim 10 wherein the function control switch is contained within a cluster of switches on the steering wheel that is located adjacent the periphery of the steering wheel so as to be accessible to a driver without the driver removing his hands from the steering wheel and the cluster of switches is wired to the cellular telephone for controlling the operation thereof.

12. The combination cellular telephone and AM/FM radio receiver, player mechanism of claim 11 wherein said clusters of switches include at least two of the following: a power switch for the telephone, a volume control for the telephone, and a telephone hook switch.

13. The combination cellular telephone and AM/FM radio receiver, player mechanism of claim 11 wherein there are two of said clusters of switches, one at the 3 o'clock position on the steering wheel and one at the 9 o'clock position on the steering wheel so as to be accessible to a driver without the driver removing his hands from the steering wheel.

14. The combination cellular telephone and AM/FM radio receiver, player mechanism of claim 10 wherein an earphone is connected to the cellular telephone and a selector switch is connected for actuating either the operation of the speaker or the earphone.

* * * * *